US012519508B2

(12) United States Patent
Bedewy et al.

(10) Patent No.: US 12,519,508 B2
(45) Date of Patent: Jan. 6, 2026

(54) WEIGHT VECTOR SELECTION FOR RECONFIGURABLE INTELLIGENT SURFACE

(71) Applicant: QUALCOMM Incorporated, San Diego, CA (US)

(72) Inventors: Ahmed Bedewy, Hillsborough, NJ (US); Juergen Cezanne, Ocean Township, NJ (US); Meilong Jiang, Westfield, NJ (US); Ashwin Sampath, Skillman, NJ (US); Junyi Li, Fairless Hills, PA (US); Ozge Koymen, Princeton, NJ (US); Ori Shental, Marlboro, NJ (US)

(73) Assignee: Qualcomm Incorporated, San Diego, CA (US)

( * ) Notice: Subject to any disclaimer, the term of this patent is extended or adjusted under 35 U.S.C. 154(b) by 178 days.

(21) Appl. No.: 18/313,765

(22) Filed: May 8, 2023

(65) Prior Publication Data

US 2024/0380436 A1 Nov. 14, 2024

(51) Int. Cl.
*H04B 7/04* (2017.01)
*H04B 7/10* (2017.01)

(52) U.S. Cl.
CPC ........... *H04B 7/04013* (2023.05); *H04B 7/10* (2013.01)

(58) Field of Classification Search
CPC .............................. H04B 7/04013; H04B 7/10
See application file for complete search history.

(56) References Cited

U.S. PATENT DOCUMENTS

| 11,848,726 | B2* | 12/2023 | Yang | H04L 25/0202 |
|---|---|---|---|---|
| 12,063,087 | B2* | 8/2024 | Sun | H04B 7/04026 |
| 2020/0044702 | A1* | 2/2020 | Kakishima | H04L 5/0051 |
| 2021/0013619 | A1* | 1/2021 | Alkhateeb | H04B 7/04013 |
| 2022/0052750 | A1* | 2/2022 | Oh | H04B 7/0697 |
| 2022/0052764 | A1* | 2/2022 | Medra | H04B 10/614 |
| 2023/0078537 | A1 | 3/2023 | Yerramalli et al. | |
| 2023/0129288 | A1* | 4/2023 | Sun | H04B 7/0617 |
| | | | | 375/267 |
| 2023/0361853 | A1* | 11/2023 | Zander | H04B 7/0617 |
| 2024/0072849 | A1* | 2/2024 | Haija | H04B 7/06952 |
| 2024/0162960 | A1* | 5/2024 | Åström | H04B 7/0617 |
| 2024/0380436 | A1* | 11/2024 | Bedewy | H04B 7/04013 |

FOREIGN PATENT DOCUMENTS

WO 2022133958 A1 6/2022

OTHER PUBLICATIONS

International Search Report and Written Opinion—PCT/US2024/024064—ISA/EPO—Jul. 23, 2024.

* cited by examiner

*Primary Examiner* — Jaison Joseph
(74) *Attorney, Agent, or Firm* — Harrity & Harrity, LLP

(57) ABSTRACT

Various aspects of the present disclosure generally relate to wireless communication. In some aspects, a reconfigurable intelligent surface (RIS) may select a weight vector, from a plurality of stored weight vectors, for enabling a spatially multiplexed communication, between a transmitter and a receiver, that includes two or more layers for each polarization of a plurality of polarizations for the spatially multiplexed communication. The RIS may receive the spatially multiplexed communication from the transmitter. The RIS may transmit the spatially multiplexed communication to the receiver in accordance with the weight vector. Numerous other aspects are described.

30 Claims, 11 Drawing Sheets

WEIGHT VECTOR SELECTION FOR RECONFIGURABLE INTELLIGENT SURFACE

FIELD OF THE DISCLOSURE

Aspects of the present disclosure generally relate to wireless communication and to techniques and apparatuses for weight vector selection for a reconfigurable intelligent surface.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter. The method may include selecting a weight vector, from a plurality of stored weight vectors, for a reconfigurable intelligent surface (RIS) that is configured to enable a spatially multiplexed communication, between the transmitter and a receiver, that includes two or more layers for each polarization of a plurality of polarizations for the spatially multiplexed communication. The method may include transmitting, to the receiver via the RIS, the spatially multiplexed communication in accordance with the weight vector.

Some aspects described herein relate to a method of wireless communication performed by a receiver. The method may include selecting a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication. The method may include receiving, from the transmitter via the RIS, the spatially multiplexed communication in accordance with the weight vector.

Some aspects described herein relate to a method of wireless communication performed by a RIS. The method may include selecting a weight vector, from a plurality of stored weight vectors, for enabling a spatially multiplexed communication, between a transmitter and a receiver, that includes two or more layers for each polarization of a plurality of polarizations for the spatially multiplexed communication. The method may include receiving the spatially multiplexed communication from the transmitter. The method may include transmitting the spatially multiplexed communication to the receiver in accordance with the weight vector.

Some aspects described herein relate to a transmitter for wireless communication. The transmitter user equipment may include one or more memories and one or more processors coupled to the one or more memories. The one or more processors may be configured to select a weight vector, from a plurality of stored weight vectors, for a RIS that is configured to enable a spatially multiplexed communication, between the transmitter and a receiver, that includes two or more layers for each polarization of a plurality of polarizations for the spatially multiplexed communication. The one or more processors may be configured to transmit, to the receiver via the RIS, the spatially multiplexed communication in accordance with the weight vector.

Some aspects described herein relate to a receiver for wireless communication. The receiver user equipment may include one or more memories and one or more processors coupled to the one or more memories. The one or more processors may be configured to select a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication. The one or more processors may be configured to receive, from the transmitter via the RIS, the spatially multiplexed communication in accordance with the weight vector.

Some aspects described herein relate to a RIS for wireless communication. The reconfigurable intelligent surface may include one or more memories and one or more processors coupled to the one or more memories. The one or more processors may be configured to select a weight vector, from a plurality of stored weight vectors, for enabling a spatially multiplexed communication, between a transmitter and a receiver, that includes two or more layers for each polarization of a plurality of polarizations for the spatially multiplexed communication. The one or more processors may be configured to receive the spatially multiplexed communication from the transmitter. The one or more processors may be configured to transmit the spatially multiplexed communication to the receiver in accordance with the weight vector.

Some aspects described herein relate to a non-transitory computer-readable medium that stores a set of instructions for wireless communication by a transmitter. The set of instructions, when executed by one or more processors of the UE, may cause the UE to select a weight vector, from a plurality of stored weight vectors, for a RIS that is configured to enable a spatially multiplexed communication, between the transmitter and a receiver, that includes two or more layers for each polarization of a plurality of polarizations for the spatially multiplexed communication. The set of instructions, when executed by one or more processors of the UE, may cause the UE to transmit, to the receiver via the RIS, the spatially multiplexed communication in accordance with the weight vector.

Some aspects described herein relate to a non-transitory computer-readable medium that stores a set of instructions for wireless communication by a receiver. The set of instructions, when executed by one or more processors of the UE, may cause the UE to select a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication. The set of instructions, when executed by one or more processors of the UE, may cause the UE to receive, from the transmitter via the RIS, the spatially multiplexed communication in accordance with the weight vector.

Some aspects described herein relate to a non-transitory computer-readable medium that stores a set of instructions for wireless communication by a RIS. The set of instructions, when executed by one or more processors of the RIS, may cause the RIS to select a weight vector, from a plurality of stored weight vectors, for enabling a spatially multiplexed communication, between a transmitter and a receiver, that includes two or more layers for each polarization of a plurality of polarizations for the spatially multiplexed communication. The set of instructions, when executed by one or more processors of the RIS, may cause the RIS to receive the spatially multiplexed communication from the transmitter. The set of instructions, when executed by one or more processors of the RIS, may cause the RIS to transmit the spatially multiplexed communication to the receiver in accordance with the weight vector.

Some aspects described herein relate to an apparatus for wireless communication. The apparatus may include means for selecting a weight vector, from a plurality of stored weight vectors, for a RIS that is configured to enable a spatially multiplexed communication, between a transmitter and a receiver, that includes two or more layers for each polarization of a plurality of polarizations for the spatially multiplexed communication. The apparatus may include means for transmitting, to the receiver via the RIS, the spatially multiplexed communication in accordance with the weight vector.

Some aspects described herein relate to an apparatus for wireless communication. The apparatus may include means for selecting a weight vector, from a plurality of stored weight vectors, for a RIS that is configured to enable a spatially multiplexed communication, between a transmitter and a receiver, that includes two or more layers for each polarization of a plurality of polarizations for the spatially multiplexed communication. The apparatus may include means for receiving, from the transmitter via the RIS, the spatially multiplexed communication in accordance with the weight vector.

Some aspects described herein relate to an apparatus for wireless communication. The apparatus may include means for selecting a weight vector, from a plurality of stored weight vectors, for enabling a spatially multiplexed communication, between a transmitter and a receiver, that includes two or more layers for each polarization of a plurality of polarizations for the spatially multiplexed communication. The apparatus may include means for receiving the spatially multiplexed communication from the transmitter. The apparatus may include means for transmitting the spatially multiplexed communication to the receiver in accordance with the weight vector.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
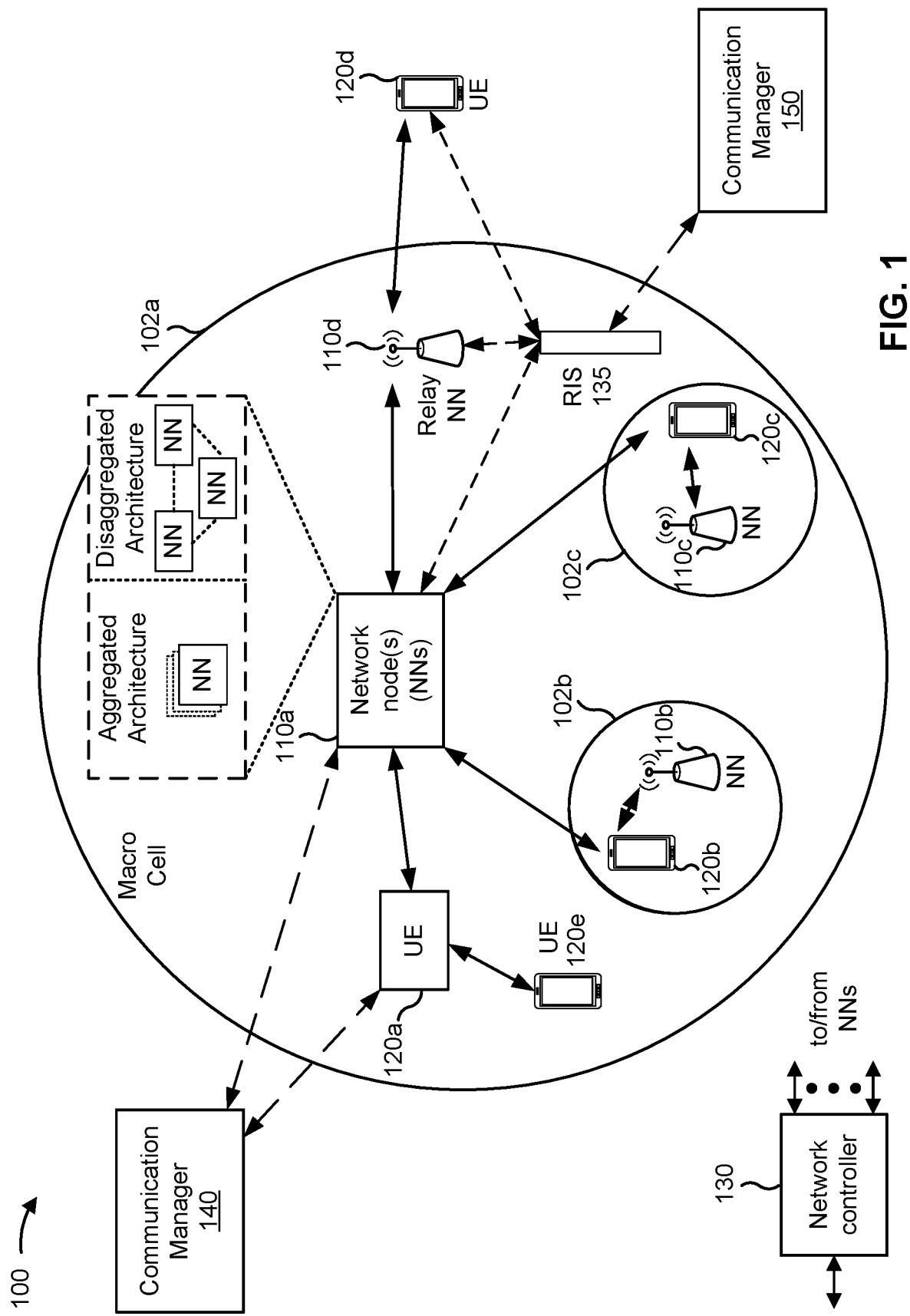
FIG. 1 is a diagram illustrating an example of a wireless network, in accordance with the present disclosure.

A transmitter and a receiver may communicate using spatially multiplexed line-of-sight (LOS) communications. The spatially multiplexed LOS communications may include two or more layers per polarization. For example, two or more independent layers (e.g., data streams) may be transmitted for each polarization of the LOS communication. The data streams may be encoded onto orthogonal polarizations of an electromagnetic wave, and each polarization may be transmitted independently over the same frequency band. At the receiver, the different polarizations may be separated and demodulated to recover the original data streams. In the case of a blocked or weak LOS link, a reconfigurable intelligent surface (RIS) may be used to reflect communications between the transmitter and the receiver. However, the transmitter, the receiver, and/or the RIS may not be configured to determine suitable weight vectors for the RIS that support spatially multiplexed communications that include two or more layers per polarization.

Various aspects relate generally to wireless communication and more particularly to weight vector selection for a reconfigurable intelligent surface. A RIS may include a plurality of reflective elements and may enable beam sweeping for spatially multiplexed communications that include two or more layers per polarization. For example, the RIS may be configured to reflect, between a transmitter and a receiver, a spatially multiplexed communication having two or more data streams for each polarization of a plurality of polarizations for the spatially multiplexed communication. In some examples, the transmitter, the receiver, and/or the RIS may be configured to select the weight vector for the RIS and to transmit or receive the spatially multiplexed communication in accordance with the weight vector. The weight vector may be selected from a plurality of weight vectors that are stored at the transmitter, the receiver, and/or the RIS. In some examples, the RIS may behave as a convex mirror, a concave mirror, or a flat mirror. For example, a first weight vector may cause the RIS to behave as a convex mirror, a second weight vector may cause the RIS to behave as a concave mirror, and a third weight vector may cause the RIS to behave as a flat mirror. In some examples, each weight vector may be associated with a different coverage area for a system that includes the transmitter, the receiver, and the RIS. For example, the first weight vector may cause the RIS to perform as a mirror having a first orientation or a first curvature and the second weight vector may cause the RIS to perform as a mirror having a second orientation or a second curvature. In some examples, a wider coverage region may be used to reduce a length of a search for the RIS weights. As the coverage region shrinks, the received power may increase, which may result in a higher throughput for the spatially multiplexed communication.

Particular aspects of the subject matter described in this disclosure can be implemented to realize one or more of the following potential advantages. In some examples, by selecting a weight vector for the RIS, the described techniques can be used to enable beam sweeping at the RIS for spatially multiplexed communications having two or more layers per polarization. For example, by selecting the weight vector for the RIS, the RIS may perform as a convex mirror, a concave mirror, or a flat mirror, and may be configured to relay, between a transmitter and a receiver, the spatially multiplexed communication having the two or more layers per polarization. The transmitter, the receiver, and/or the RIS may select the weight vectors for the RIS in order to adjust a coverage area, orientation, or curvature of the reflective elements associated with the RIS. Additionally, or alternatively, the weight vector may be used to control a power and/or a beam width for the spatially multiplexed communication. These benefits, among others, are described in more detail below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

In some aspects, the wireless network 100 may include a RIS 135. As described in more detail herein, the RIS 135 may be configured to enable spatially multiplexed communications between a transmitter and a receiver. For example, the RIS 135 may transmit and/or relay the spatially multiplexed communications between the transmitter and the receiver.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components.

In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or May be within the EHF band. It is contemplated that the frequencies included in these operating bands (e.g., FR1, FR2, FR3, FR4, FR4-a. FR4-1, and/or FR5) may be modified, and techniques described herein are applicable to those modified frequency ranges.

In some aspects, a transmitter may include a communication manager 140. The communication manager 140 may be included, for example, in the UE 120 or the network node 110. As described in more detail elsewhere herein, the communication manager 140 may select a weight vector, from a plurality of stored weight vectors, for a RIS that is configured to enable a spatially multiplexed communication, between a transmitter and a receiver, that includes two or more layers for each polarization of a plurality of polarizations for the spatially multiplexed communication; and transmit, to the receiver via the RIS, the spatially multiplexed communication in accordance with the weight vector. Additionally, or alternatively, the communication manager 140 may perform one or more other operations described herein.

In some aspects, a receiver may include the communication manager 140. The communication manager 140 may be included, for example, in the UE 120 or the network node 110. As described in more detail herein, the communication manager 140 may select a weight vector, from a plurality of stored weight vectors, for a RIS that is configured to enable a spatially multiplexed communication, between a transmitter and a receiver, that includes two or more layers for each polarization of a plurality of polarizations for the spatially multiplexed communication; and receive, from the transmitter via the RIS, the spatially multiplexed communication in accordance with the weight vector. Additionally, or alternatively, the communication manager 140 may perform one or more other operations described herein.

In some aspects, the RIS 135 may include a communication manager 150. As described in more detail elsewhere herein, the communication manager 150 may select a weight vector, from a plurality of stored weight vectors, for enabling a spatially multiplexed communication, between a transmitter and a receiver, that includes two or more layers for each polarization of a plurality of polarizations for the spatially multiplexed communication; receive the spatially multiplexed communication from the transmitter; and transmit the spatially multiplexed communication to the receiver in accordance with the weight vector. Additionally, or alternatively, the communication manager 150 may perform one or more other operations described herein.

As indicated above, FIG. 1 is provided as an example. Other examples may differ from what is described with regard to FIG. 1.

Figure 2:
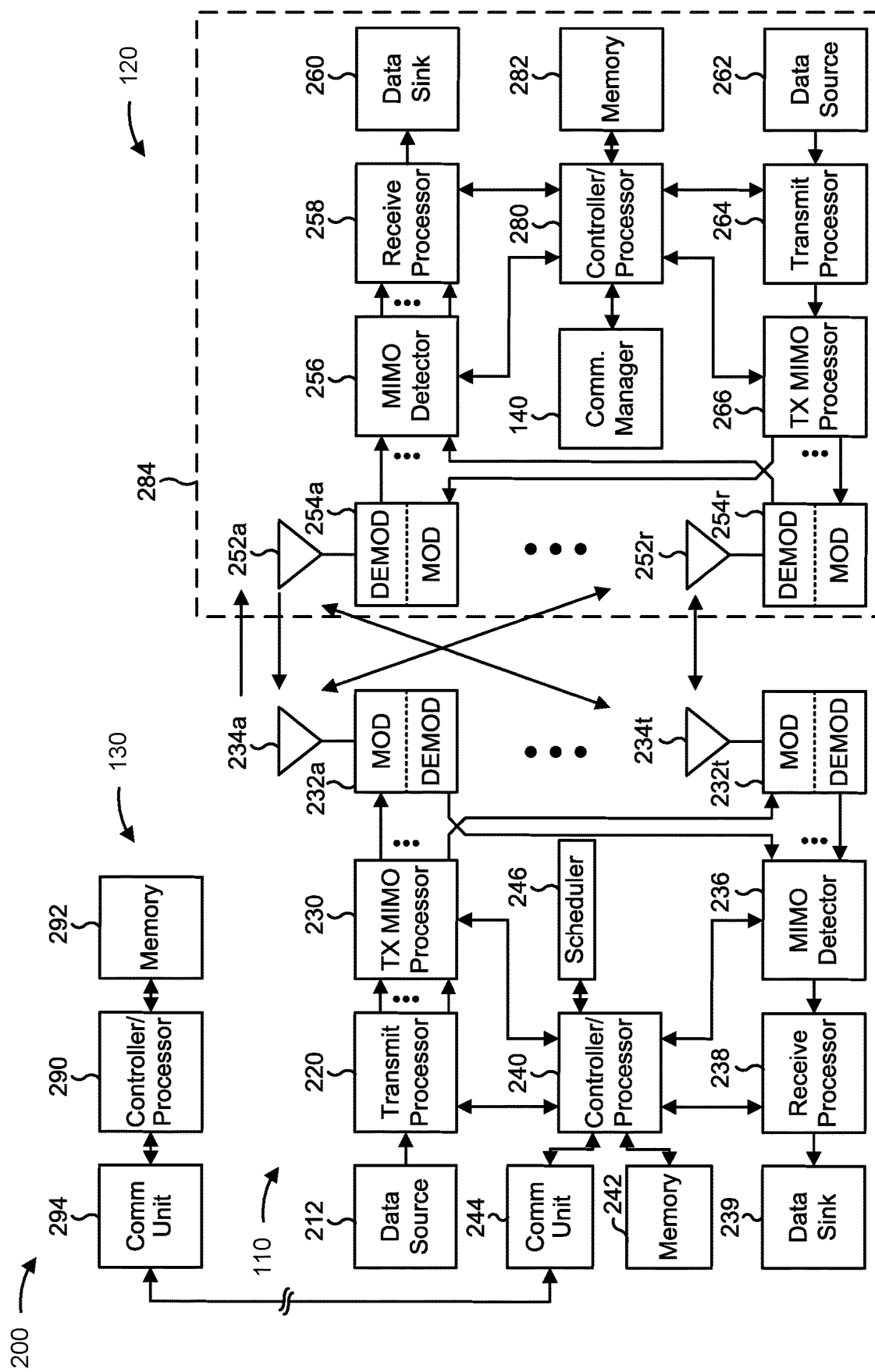
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with weight vector selection for a RIS, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a transmitter includes means for selecting a weight vector, from a plurality of stored weight vectors, for a RIS that is configured to enable a spatially multiplexed communication, between the transmitter and a receiver, that includes two or more layers for each polarization of a plurality of polarizations for the spatially multiplexed communication; and/or means for transmitting, to the receiver via the RIS, the spatially multiplexed communication in accordance with the weight vector. The means for the transmitter to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a receiver includes means for selecting a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication; and/or means for receiving, from the transmitter via the RIS, the spatially multiplexed communication in accordance with the weight vector. The means for the receiver to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the RIS includes means for selecting a weight vector, from a plurality of stored weight vectors, for enabling a spatially multiplexed communication, between a transmitter and a receiver, that includes two or more layers for each polarization of a plurality of polarizations for the spatially multiplexed communication; means for receiving the spatially multiplexed communication from the transmitter; and/or means for transmitting the spatially multiplexed communication to the receiver in accordance with the weight vector. In some aspects, the means for the RIS to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
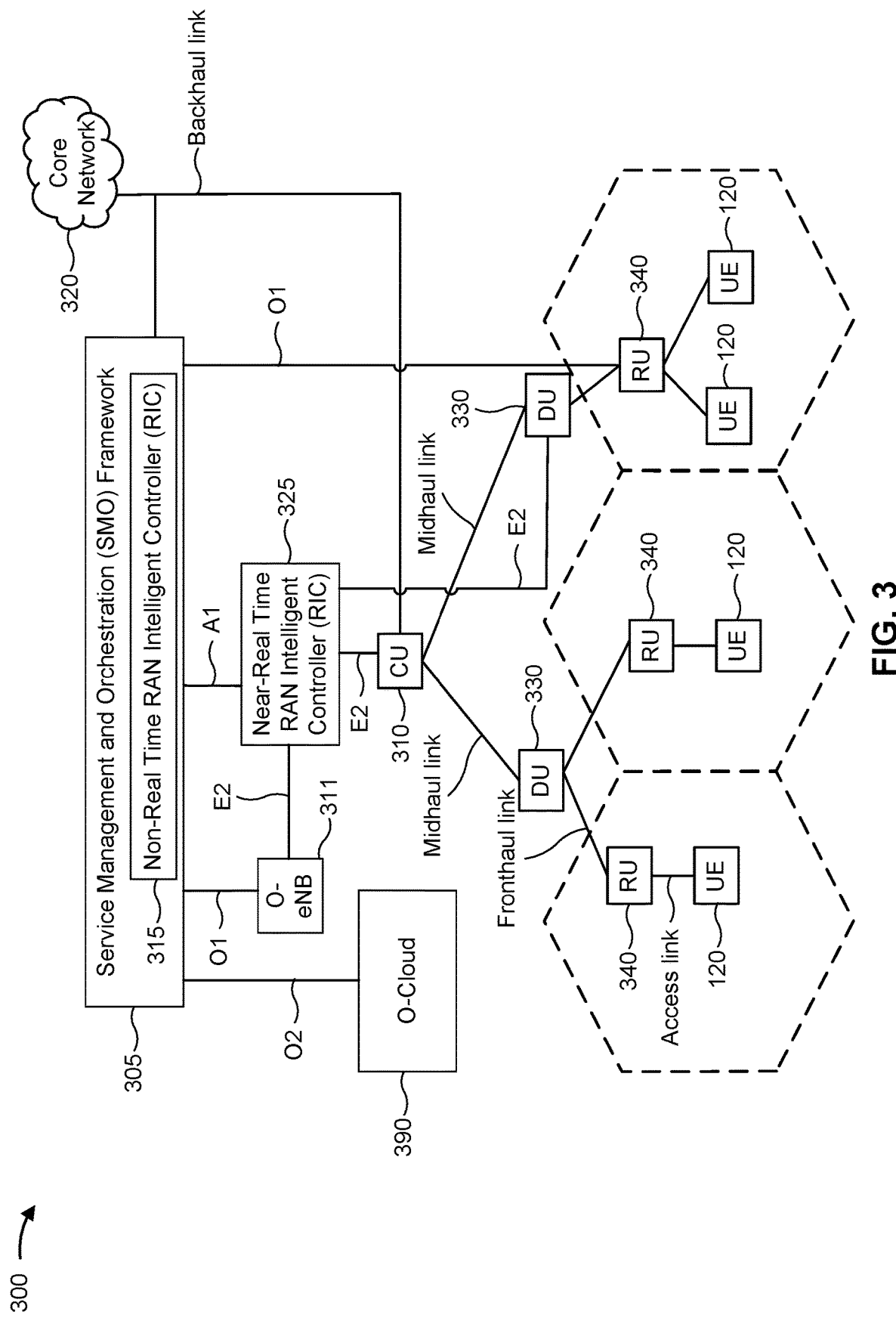
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUS 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
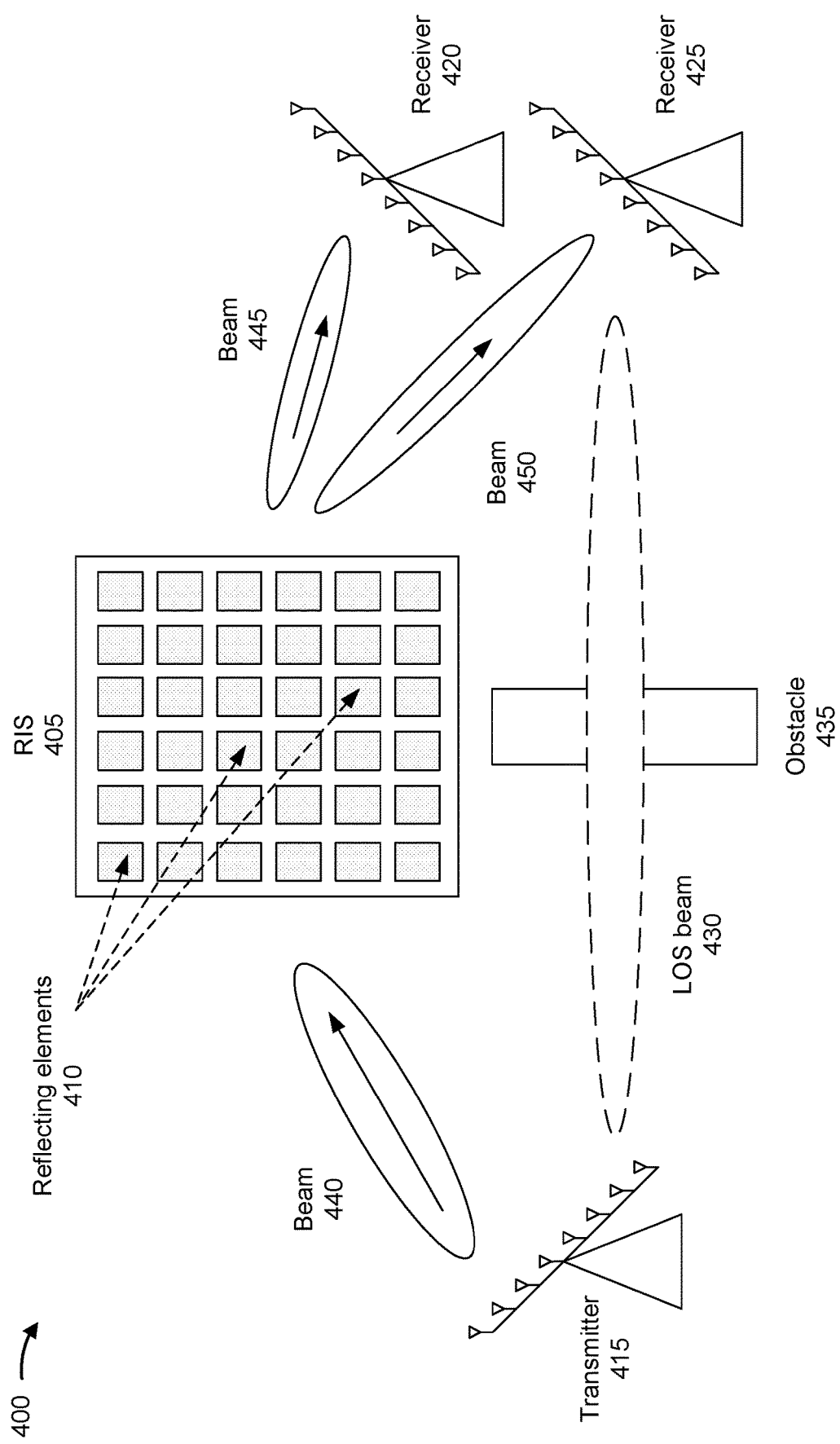
FIG. 4 is a diagram illustrating an example of a reconfigurable intelligent surface, in accordance with the present disclosure.

FIG. 4 is a diagram illustrating an example 400 of a reconfigurable intelligent surface, in accordance with the present disclosure.

Spatial multiplexing may include sending separate data signals or streams between antennae to enhance wireless signal performance or functionality. This may create spatial diversity and may increase the possibilities for various types of end-to-end communications (such as multiple-input multiple-output (MIMO) communications). In some cases, such as for wireless fronthaul deployments, large arrays for line-of-sight (LOS) communication may be used to achieve high channel capacities. Multiple antennas may be used to establish spatially multiplexed LOS communications over a direct path between a transmitter and a receiver. In some cases, blockage (e.g., foliage) in the LOS between the transmitter and the receiver may impact a performance of the system. Additionally, the performance of the communications may degrade as the distance between transmitter and the receiver increases, which may result from a reduction of a spatial multiplexing order.

A RIS is an array of reflecting elements that can be dynamically reconfigured to control reflection and scattering of electromagnetic waves. The RIS can be used to direct incident waves from a transmitter towards a desired direction (e.g., in a direction of the receiver). A RIS may be a passive or nearly passive device. The RIS is environmentally friendly (e.g., in contrast to conventional relaying systems or network-controlled repeaters) and is easy to deploy. The RIS can be deployed on various structures, including but not limited to building facades, indoor walls, aerial platforms, and roadside billboards, among other examples. A dynamic configuration of the RIS can be achieved by adjusting the weights of the reflecting elements, which in result may affect the direction of the reflected wave. A smart control entity on the weights of the RIS elements can be used to manage the coverage and direction of the reflected beam, which can help in enhancing the performance of LOS connection or replacing the performance of LOS connection it in the case of a complete blockage.

As shown in the example 400, a RIS 405 may include a plurality of reflecting elements 410. The reflecting elements 410 may be adjustable, for example, to improve communications between a transmitter 415 and one or more receivers, such as receiver 420 and/or receiver 425. In some cases, an LOS beam 430 between the transmitter 415 and the receiver 425 (and/or between the transmitter 415 and the receiver 420) may be blocked (or partially blocked) by an obstacle 435. In this case, the transmitter 415 may transmit a beam 440 to be reflected off of the reflecting elements 410 associated with the RIS 405. For example, the beam 440 may be reflected off of a first portion of the reflecting elements 410 to form a beam 445 that is to be received by the receiver 420. Additionally, or alternatively, the beam 440 may be reflected off of a second portion of the reflecting elements 410 to form a beam 450 that is to be received by the receiver 425. The first portion of the reflecting elements 410 may have a first characteristic (e.g., a first weight vector) and the second portion of the reflecting elements may have a second characteristic (e.g., a second weight vector). A weight vector is a set of complex values that indicate a reflection coefficient for one or more reflective elements of the RIS. A reflection coefficient for a reflective element of the RIS may indicate a magnitude and/or a phase of a reflected signal at the reflective element, and may be determined, for example, by the weight vector and the frequency of the incident signal. The weight vector may be optimized to achieve one or more performance objectives for the RIS, such as to maximize a signal-to-noise (SNR) ratio, to minimize interference, and/or to enhance a coverage area of the RIS.

Large arrays at a transmitter and a receiver may be used to enable spatially multiplexed LOS communication, for example, in high millimeter wave (mmWave) or sub-terahertz (sub-THz) bands. The spatially multiplexed LOS communication may include two or more layers per polarization. For example, two or more independent layers (e.g., data streams) may be transmitted for each polarization of the LOS communication. The data streams may be encoded onto orthogonal polarizations of an electromagnetic wave, and each polarization may be transmitted independently over the same frequency band. At the receiver, the different polarizations may be separated and demodulated to recover the original data streams. In case of a blocked or weak LOS link, the RIS may be used to improve the performance of the communications between the transmitter and the receiver. However, the transmitter, the receiver, and/or the RIS may not be configured to determine suitable weight vectors for the RIS that support spatially multiplexed communications that include two or more layers per polarization.

As indicated above, FIG. 4 is provided as an example. Other examples may differ from what is described with regard to FIG. 4.

Figure 5:
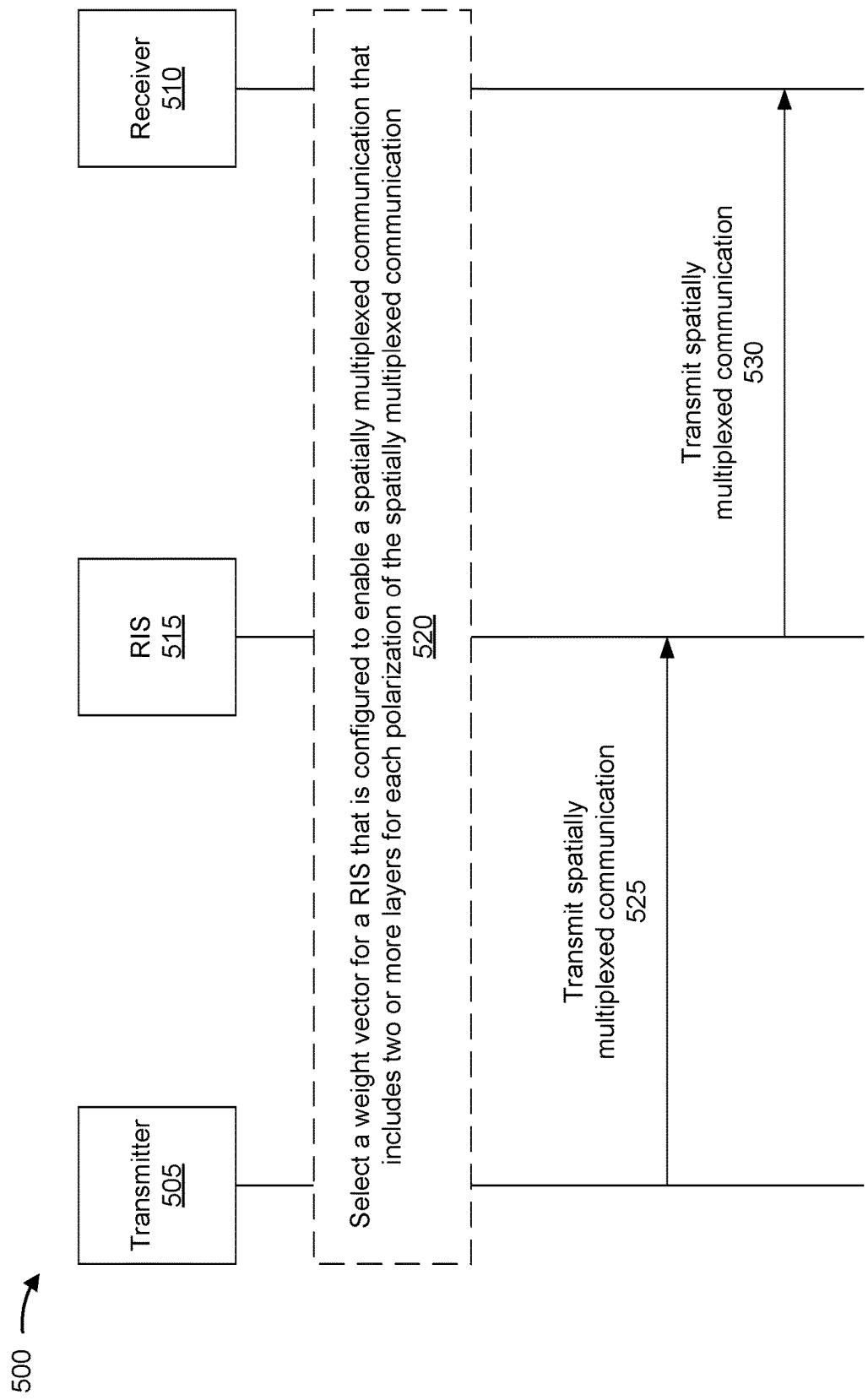
FIG. 5 is a diagram illustrating an example of weight vector selection for a reconfigurable intelligent surface, in accordance with the present disclosure.

FIG. 5 is a diagram illustrating an example 500 of weight vector selection for a reconfigurable intelligent surface, in accordance with the present disclosure.

In some aspects, a RIS may be configured to enable beam sweeping for spatially multiplexed communications having two or more layers (e.g., data streams) per polarization. Weight vectors for the RIS (e.g., for reflective elements of the RIS) may be designed such that the RIS behaves as a convex mirror, a concave mirror, or a flat mirror, with variable orientations. This design may support spatially multiplexed communications between a transmitter and a receiver since the communication between the transmitter and the receiver through a properly sized RIS may be equivalent to an LOS communication between the mirror images of the transmitter elements and receiver elements (and vice versa). A location of the region covered by the RIS may depend on the orientation and the angle of incidence from the transmitter. In some aspects, the RIS can behave as a mirror with variable orientation, and the orientation may be determined in accordance with the RIS weights. In one example, the size of the coverage region may be increased by using the RIS as a convex mirror. A smaller radius for the convex mirror may result in a wider coverage region. The RIS can behave as a convex mirror and a curvature for the mirror may be changed by adjusting the weights. Therefore, a location and size of the covered region may be controlled based at least in part on adjusting the weights. In some aspects, a wider coverage region may be used to reduce a length of a search for optimal RIS weights. The wider coverage region may also be used for accommodating a moving receiver, such as a vibrating receiver antenna. As the coverage region shrinks, the received power at the receiver increases, which may result in a higher throughput. In some aspects, for a large RIS size and a given receiver location, the received power may be focused by emulating a concave mirror. However, the received power may drop (significantly) as the receiver moves away from the focal point. A codebook with RIS beams scanning different directions with different beam widths and three dimensional beams may focus power at a certain distance. In some aspects, the RIS weights may be stored as a table in a memory of the transmitter, the receiver, and or the RIS. Additionally, or alternatively, a network node may transmit an indication of the RIS weight, such as an index of a table entry to be applied by the RIS.

As shown in the example 500, a transmitter 505 and a receiver 510 may communicate via a RIS 515. For example, the transmitter 505, which may be a transmitter UE, may transmit a communication to the RIS 515, and the RIS 515 may transmit (e.g., reflect) the communication to the receiver 510, which may be a receiver UE. The communication may be a spatially multiplexed communication having two or more layers per polarization.

As shown by reference number 520, the transmitter 505, the receiver 510, and/or the RIS 515 may select a weight vector for the RIS 515 that is configured to transmit the spatially multiplexed communication, from the transmitter 505 to the receiver 510, that includes the two or more layers per polarization. In some aspects, the plurality of stored weight vectors may be stored at the transmitter 505, the receiver 510, and/or the RIS 515.

In some aspects, two or more of the weight vectors may be applied sequentially at the RIS 515. The receiver 510 may be configured to measure a performance of each signal received from the RIS 515 and to determine one or more weight vectors (e.g., N weight vectors) associated with a best performance of the system that includes the transmitter 505, the receiver 510, and the RIS 515. The receiver 510 may transmit an indication of the one or more weight vectors associated with the best performance of the system (with or without the value of a corresponding performance parameter) to a network node (such as the network node 110). The network node may select a weight vector from the one or more weight vectors and may transmit, to the RIS 515, an indication of the weight vector to be used for data transmission. The RIS 515 may use the weight vector indicated by the network node for uplink and downlink communications.

In some aspects, the transmitter 505, the receiver 510, and/or the RIS 515 may receive, from the network node, an indication of two or more RIS weight vectors to be applied by the RIS 515, and an indication of a transmitter weight vector that improves a system performance for a receiver weight vector. In this example, the transmitter 505, the receiver 510, and/or the RIS 515 may identify, for each RIS weight vector of the two or more RIS weight vectors, a system performance for each transmitter weight vector of a plurality of transmitter weight vectors, and/or may identify, for each transmitter weight vector of the plurality of transmitter weight vectors, a system performance for each RIS weight vector of the two or more RIS weight vectors. In some aspects, the transmitter 505, the receiver 510, and/or the RIS 515 may receive, from the network node, an indication of two or more RIS weight vectors to be applied by the RIS 515, and an indication of a receiver weight vector that improves a system performance for a transmitter weight vector. In this example, the transmitter 505, the receiver 510, and/or the RIS 515 may identify, for each RIS weight vector of the two or more RIS weight vectors, a system performance for each receiver weight vector of a plurality of receiver weight vectors, and/or may identify, for each receiver weight vector of the plurality of receiver weight vectors, a system performance for each RIS weight vector of the two or more RIS weight vectors.

In some aspects, the plurality of stored weight vectors may be associated with a set of arrival azimuth and zenith angles and/or a set of departure azimuth and zenith angles. In some aspects, the plurality of stored weight vectors may be associated with a set of distance pairs. Each distance pair of the set of distance pairs may indicate a distance between the transmitter 505 and the RIS 515 and a distance between the RIS 515 and the receiver 510. In some aspects, the plurality of stored weight vectors may be associated with the RIS 515 performing as a plane mirror, a convex mirror, and/or a concave mirror. In some examples, each weight vector of the plurality of stored weight vectors may be associated with a different coverage area for the system. In some examples, each weight vector of the plurality of stored weight vectors may be associated with a different orientation of the RIS 515 (e.g., the reflective elements associated with the RIS 515). In some examples, each weight vector of the plurality of stored weight vectors may be associated with the RIS 515 performing as a mirror having a particular curvature (for example, a convex curvature, a concave curvature, or no curvature). In some aspects, the weight vector may be selected in accordance with one or more characteristics of the transmitter 505 and/or one or more characteristics of the receiver 510.

As shown by reference number 525, the transmitter 505 may transmit, and the RIS 515 may receive, the spatially multiplexed communication having the two or more layers per polarization. As shown by reference number 530, the RIS 515 may transmit, and the receiver 510 may receive, the spatially multiplexed communication having the two or more layers per polarization. For example, the RIS 515 may reflect the spatially multiplexed communication from the transmitter 505 to the receiver 510 using one or more RIS characteristics (or reflective element characteristics) described herein.

As indicated above, FIG. 5 is provided as an example. Other examples may differ from what is described with regard to FIG. 5.

Figure 6:
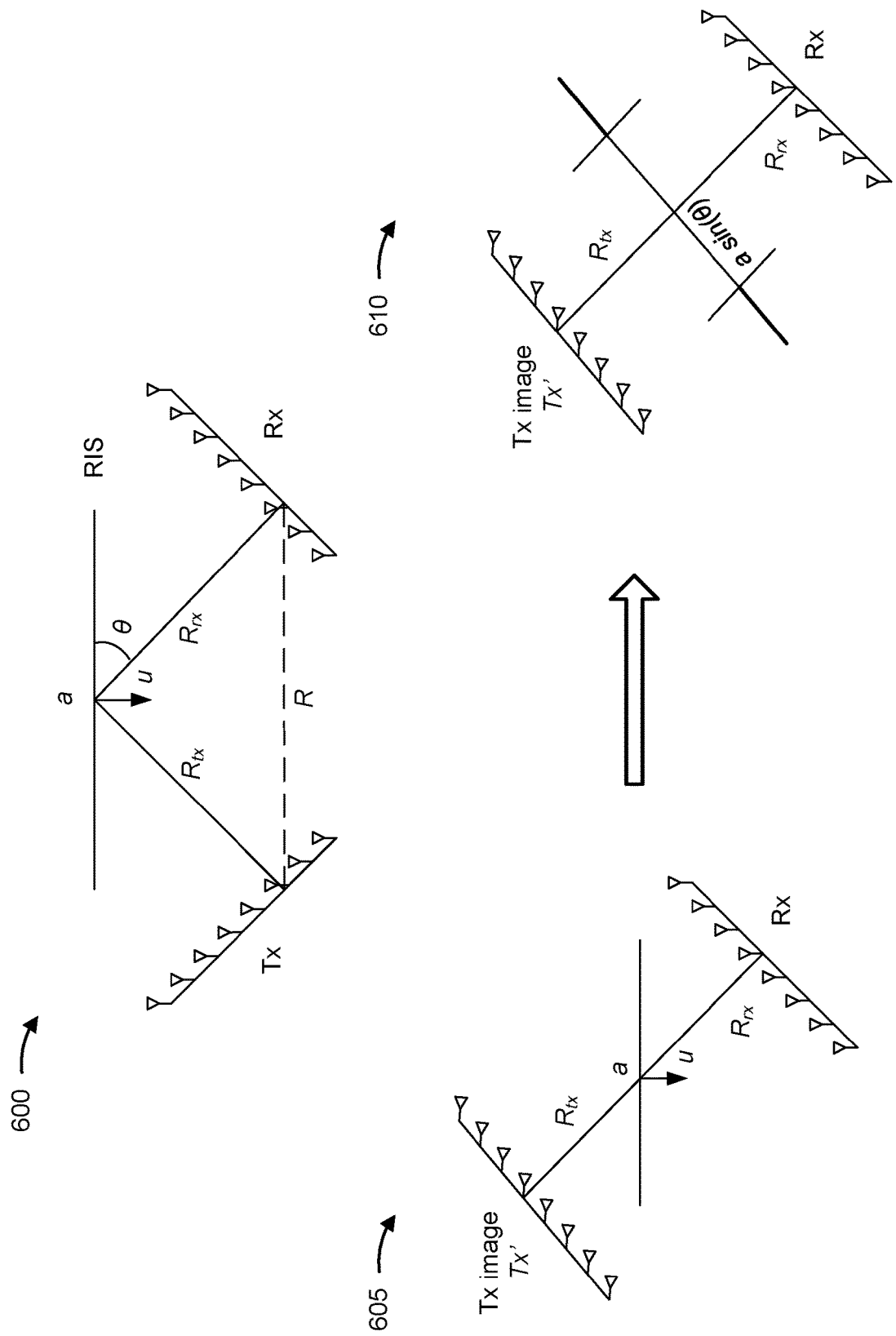
FIG. 6 is a diagram illustrating examples of reconfigurable intelligent surface communications, in accordance with the present disclosure.

FIG. 6 is a diagram illustrating examples of reconfigurable intelligent surface communications, in accordance with the present disclosure. As shown in the example 600, a LOS communication R between a transmitter (Tx) and a receiver (Rx) may not be possible. For example, the LOS communication R may be at least partially blocked by an obstacle. The transmitter may transmit a beam $R_{tx}$ to a surface a associated with a RIS. The beam $R_{tx}$ may be reflected off of the surface a, and may be received by the receiver as beam $R_{rx}$. The beam $R_{rx}$ may have an angle θ with respect to the surface a, and the surface a may be perpendicular to u. As shown by reference number 605, the communications associated with the beams $R_{tx}$ and $R_{rx}$ may be equivalent to an LOS communication associated with a transmitter image Tx. As shown by reference number 610, the beams $R_{tx}$ and $R_{rx}$ may be perpendicular to a*sin(θ).

As indicated above, FIG. 6 is provided as an example. Other examples may differ from what is described with regard to FIG. 6.

Figure 7:
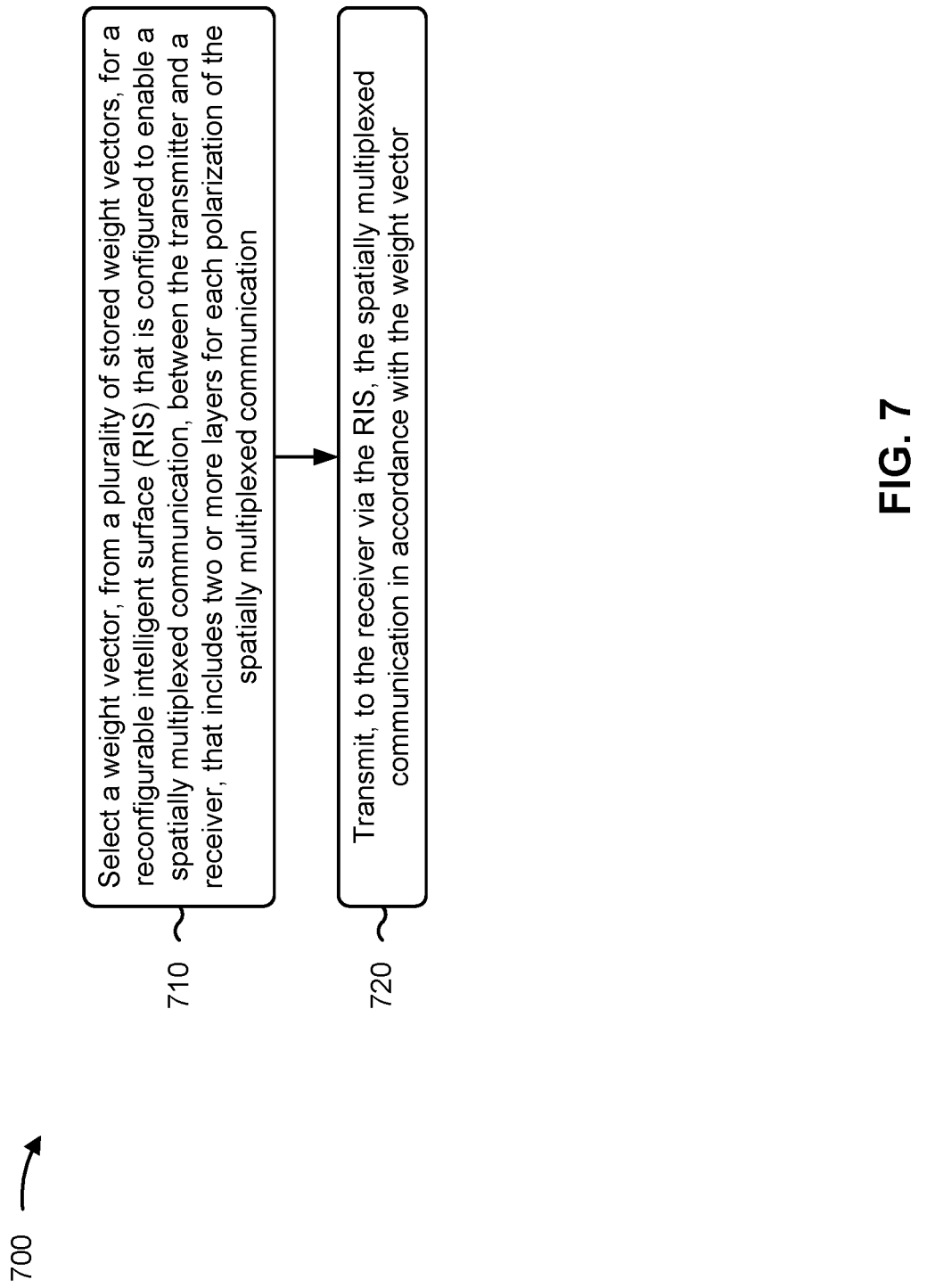
FIG. 7 is a diagram illustrating an example process performed, for example, by a UE, in accordance with the present disclosure.

FIG. 7 is a diagram illustrating an example process 700 performed, for example, by a UE or a network node, in accordance with the present disclosure. Example process 700 is an example where the UE (e.g., UE 120) or the network node (e.g., network node 110) performs operations associated with weight vector selection for a RIS.

As shown in FIG. 7, in some aspects, process 700 may include selecting a weight vector, from a plurality of stored weight vectors, for a RIS that is configured to enable a spatially multiplexed communication, between the transmitter and a receiver, that includes two or more layers for each polarization of a plurality of polarizations for the spatially multiplexed communication (block 710). For example, the UE or the network node (e.g., using communication manager 1006, depicted in FIG. 10) may select a weight vector, from a plurality of stored weight vectors, for a RIS that is configured to enable a spatially multiplexed communication, between the transmitter and a receiver, that includes two or more layers for each polarization of a plurality of polarizations for the spatially multiplexed communication, as described above.

As further shown in FIG. 7, in some aspects, process 700 may include transmitting, to the receiver via the RIS, the spatially multiplexed communication in accordance with the weight vector (block 720). For example, the UE or the network node (e.g., using transmission component 1004 and/or communication manager 1006, depicted in FIG. 10) may transmit, to the receiver via the RIS, the spatially multiplexed communication in accordance with the weight vector, as described above.

Process 700 may include additional aspects, such as any single aspect or any combination of aspects described below and/or in connection with one or more other processes described elsewhere herein.

In a first aspect, the plurality of stored weight vectors are stored by at least one of the transmitter, the receiver, or the RIS.

In a second aspect, alone or in combination with the first aspect, process 700 further includes applying each weight vector of the plurality of stored weight vectors to the RIS sequentially, wherein only a single weight vector is applied to the RIS at a time.

In a third aspect, alone or in combination with one or more of the first and second aspects, process 700 includes receiving, from a network node, an indication of a pair of weight vectors and an indication of a transmitter weight vector that satisfies a system performance threshold for a corresponding receiver weight vector, wherein only a single weight vector is applied to the RIS at a time.

In a fourth aspect, alone or in combination with one or more of the first through third aspects, process 700 includes identifying, for each weight vector of the pair of weight vectors, a system performance for each transmitter weight vector of a plurality of transmitter weight vectors, or identifying, for each transmitter weight vector of the plurality of transmitter weight vectors, a system performance for each weight vector of the pair of weight vectors.

In a fifth aspect, alone or in combination with one or more of the first through fourth aspects, process 700 includes receiving, from a network node, an indication of a pair of weight vectors and an indication of a receiver weight vector that satisfies a system performance threshold for a corresponding transmitter weight vector, wherein only a single weight vector is applied to the RIS at a time.

In a sixth aspect, alone or in combination with one or more of the first through fifth aspects, process 700 includes identifying, for each weight vector of the pair of weight vectors, a system performance for each receiver weight vector of a plurality of receiver weight vectors, or identifying, for each receiver weight vector of the plurality of receiver weight vectors, a system performance for each weight vector of the pair of weight vectors.

In a seventh aspect, alone or in combination with one or more of the first through sixth aspects, the plurality of stored weight vectors are associated with a set of arrival azimuth and zenith angles and a set of departure azimuth and zenith angles.

In an eighth aspect, alone or in combination with one or more of the first through seventh aspects, the plurality of stored weight vectors are associated with a set of distance pairs, each distance pair of the set of distance pairs indicating a distance between the transmitter and the RIS and a distance between the RIS and the receiver.

In a ninth aspect, alone or in combination with one or more of the first through eighth aspects, the plurality of stored weight vectors are associated with the RIS performing as a plane mirror, a convex mirror, or a concave mirror.

In a tenth aspect, alone or in combination with one or more of the first through ninth aspects, each weight vector of the plurality of stored weight vectors is associated with a different coverage area for a system that includes the transmitter, the receiver, and the RIS.

In an eleventh aspect, alone or in combination with one or more of the first through tenth aspects, each weight vector of the plurality of stored weight vectors is associated with the RIS performing as a mirror having a particular orientation.

In a twelfth aspect, alone or in combination with one or more of the first through eleventh aspects, each weight vector of the plurality of stored weight vectors is associated with the RIS performing as a mirror having a particular curvature.

In a thirteenth aspect, alone or in combination with one or more of the first through twelfth aspects, selecting the weight vector comprises selecting the weight vector in accordance with one or more characteristics of a group of transmitter devices and one or more characteristics of a group of receiver devices.

In a fourteenth aspect, alone or in combination with one or more of the first through thirteenth aspects, selecting the weight vector further comprises selecting the weight vector for the RIS to perform as a convex mirror.

In a fifteenth aspect, alone or in combination with one or more of the first through fourteenth aspects, the RIS has a shape that is non-flat.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
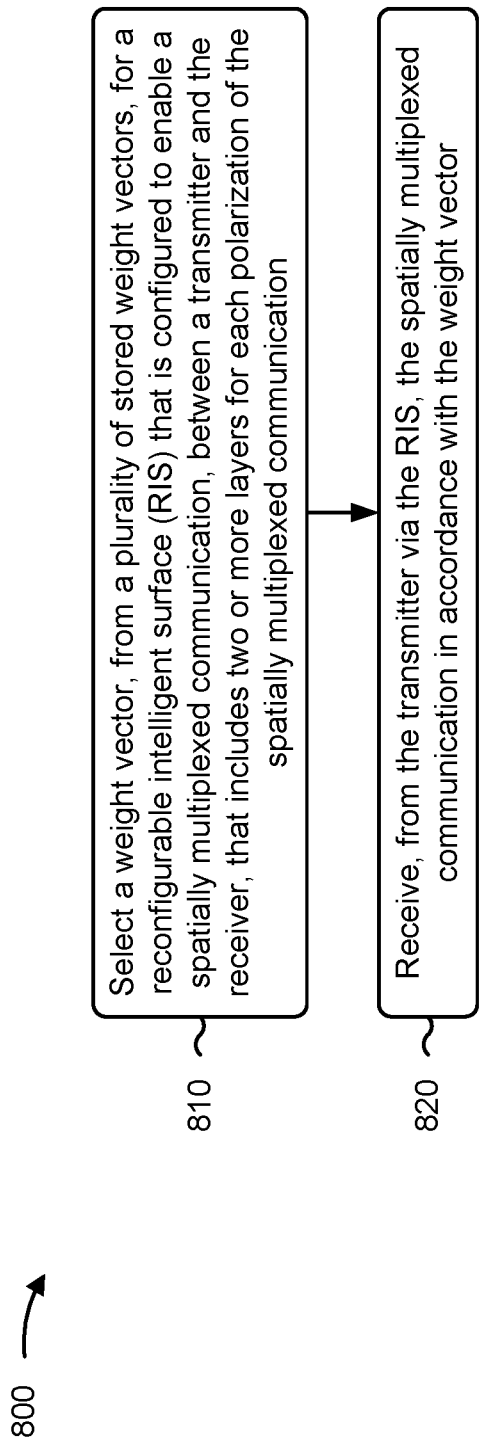
FIG. 8 is a diagram illustrating an example process performed, for example, by a UE, in accordance with the present disclosure.

FIG. 8 is a diagram illustrating an example process 800 performed, for example, by a UE or a network node, in accordance with the present disclosure. Example process 800 is an example where the UE (e.g., UE 120) or the network node (e.g., network node 110) performs operations associated with weight vector selection for a RIS.

As shown in FIG. 8, in some aspects, process 800 may include selecting a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication (block 810). For example, the UE or the network node (e.g., using communication manager 1006, depicted in FIG. 10) may select a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication, as described above.

As further shown in FIG. 8, in some aspects, process 800 may include receiving, from the transmitter via the RIS, the spatially multiplexed communication in accordance with the weight vector (block 820). For example, the UE or the network node (e.g., using reception component 1002 and/or communication manager 1006, depicted in FIG. 10) may receive, from the transmitter via the RIS, the spatially multiplexed communication in accordance with the weight vector, as described above.

Process 800 may include additional aspects, such as any single aspect or any combination of aspects described below and/or in connection with one or more other processes described elsewhere herein.

In a first aspect, the plurality of stored weight vectors are stored by at least one of the transmitter, the receiver, or the RIS.

In a second aspect, alone or in combination with the first aspect, process 800 further includes applying each weight vector of the plurality of stored weight vectors to the RIS sequentially, wherein only a single weight vector is applied to the RIS at a time, measuring a performance of a system that includes the transmitter, the receiver, and the RIS, and transmitting, to a network node, an indication of one or more weight vectors, of the plurality of stored weight vectors, associated with respective performance indicators that are greater than a performance indicator threshold.

In a third aspect, alone or in combination with one or more of the first and second aspects, process 800 includes receiving, from a network node, an indication of a pair of weight vectors and an indication of a transmitter weight vector that satisfies a system performance threshold for a corresponding receiver weight vector, wherein only a single weight vector is applied to the RIS at a time.

In a fourth aspect, alone or in combination with one or more of the first through third aspects, process 800 includes identifying, for each weight vector of the pair of weight vectors, a system performance for each transmitter weight vector of a plurality of transmitter weight vectors, or identifying, for each transmitter weight vector of the plurality of transmitter weight vectors, a system performance for each weight vector of the pair of weight vectors.

In a fifth aspect, alone or in combination with one or more of the first through fourth aspects, process 800 includes receiving, from a network node, an indication of a pair of weight vectors and an indication of a receiver weight vector that satisfies a system performance threshold for a corresponding transmitter weight vector, wherein only a single weight vector is applied to the RIS at a time.

In a sixth aspect, alone or in combination with one or more of the first through fifth aspects, process 800 includes identifying, for each weight vector of the pair of weight vectors, a system performance for each receiver weight vector of a plurality of receiver weight vectors, or identifying, for each receiver weight vector of the plurality of receiver weight vectors, a system performance for each weight vector of the pair of weight vectors.

In a seventh aspect, alone or in combination with one or more of the first through sixth aspects, the plurality of stored weight vectors are associated with a set of arrival azimuth and zenith angles and a set of departure azimuth and zenith angles.

In an eighth aspect, alone or in combination with one or more of the first through seventh aspects, the plurality of stored weight vectors are associated with a set of distance pairs, each distance pair of the set of distance pairs indicating a distance between the transmitter and the RIS and a distance between the RIS and the receiver.

In a ninth aspect, alone or in combination with one or more of the first through eighth aspects, the plurality of stored weight vectors are associated with the RIS performing as a plane mirror, a convex mirror, or a concave mirror.

In a tenth aspect, alone or in combination with one or more of the first through ninth aspects, each weight vector of the plurality of stored weight vectors is associated with a different coverage area for a system that includes the transmitter, the receiver, and the RIS.

In an eleventh aspect, alone or in combination with one or more of the first through tenth aspects, each weight vector of the plurality of stored weight vectors is associated with the RIS performing as a mirror having a particular orientation.

In a twelfth aspect, alone or in combination with one or more of the first through eleventh aspects, each weight vector of the plurality of stored weight vectors is associated with the RIS performing as a mirror having a particular curvature.

In a thirteenth aspect, alone or in combination with one or more of the first through twelfth aspects, selecting the weight vector comprises selecting the weight vector in accordance with one or more characteristics of a group of transmitter devices and one or more characteristics of a group of receiver devices.

In a fourteenth aspect, alone or in combination with one or more of the first through thirteenth aspects, selecting the weight vector further comprises selecting the weight vector for the RIS to perform as a convex mirror.

In a fifteenth aspect, alone or in combination with one or more of the first through fourteenth aspects, the RIS has a shape that is non-flat.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
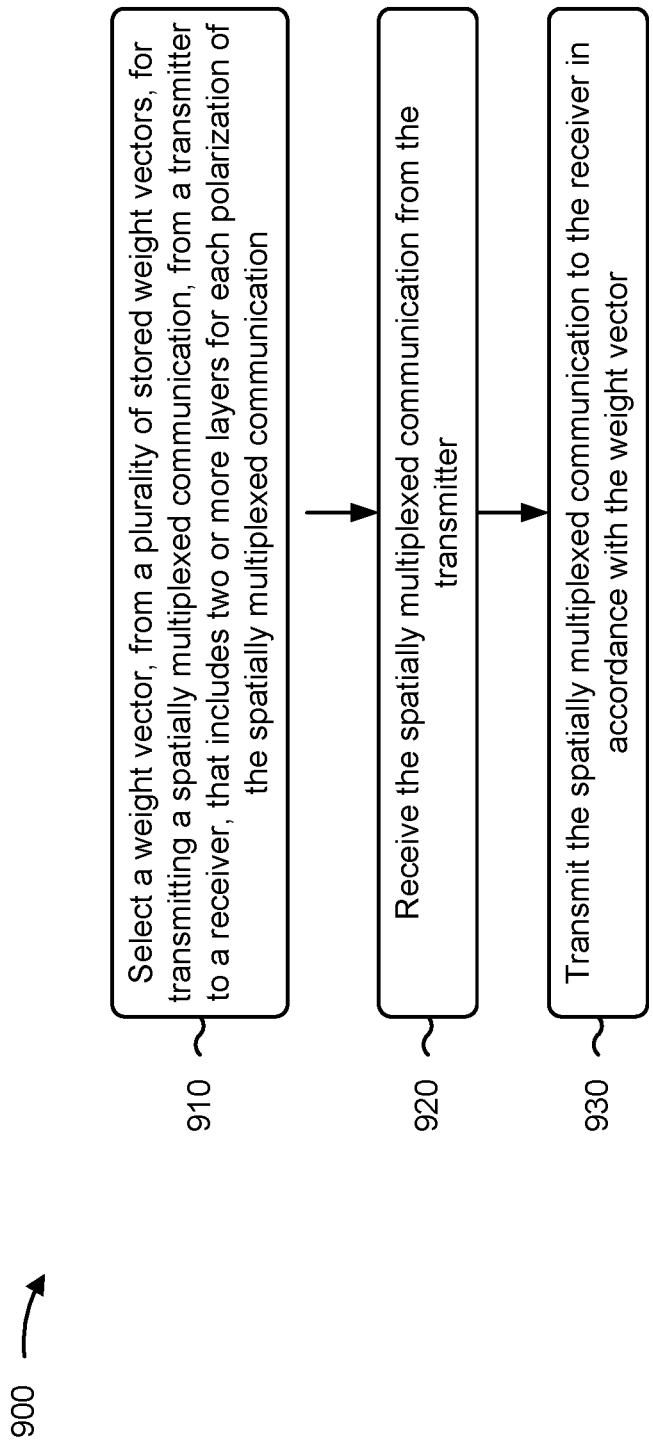
FIG. 9 is a diagram illustrating an example process performed, for example, by a reconfigurable intelligent surface, in accordance with the present disclosure.

FIG. 9 is a diagram illustrating an example process 900 performed, for example, by a RIS, in accordance with the present disclosure. Example process 900 is an example where the RIS (e.g., RIS 515) performs operations associated with weight vector selection for a RIS.

As shown in FIG. 9, in some aspects, process 900 may include selecting a weight vector, from a plurality of stored weight vectors, for enabling a spatially multiplexed communication, between a transmitter and a receiver, that includes two or more layers for each polarization of a plurality of polarizations for the spatially multiplexed communication (block 910). For example, the RIS (e.g., using communication manager 1106, depicted in FIG. 11) may select a weight vector, from a plurality of stored weight vectors, for enabling a spatially multiplexed communication, between a transmitter and a receiver, that includes two or more layers for each polarization of a plurality of polarizations for the spatially multiplexed communication, as described above.

As further shown in FIG. 9, in some aspects, process 900 may include receiving the spatially multiplexed communication from the transmitter (block 920). For example, the RIS (e.g., using reception component 1102 and/or communication manager 1106, depicted in FIG. 11) may receive the spatially multiplexed communication from the transmitter, as described above.

As further shown in FIG. 9, in some aspects, process 900 may include transmitting the spatially multiplexed communication to the receiver in accordance with the weight vector (block 930). For example, the RIS (e.g., using transmission component 1104 and/or communication manager 1106, depicted in FIG. 11) may transmit the spatially multiplexed communication to the receiver in accordance with the weight vector, as described above.

Process 900 may include additional aspects, such as any single aspect or any combination of aspects described below and/or in connection with one or more other processes described elsewhere herein.

In a first aspect, the plurality of stored weight vectors are stored by at least one of the transmitter, the receiver, or the RIS.

In a second aspect, alone or in combination with the first aspect, process 900 further includes applying each weight vector of the plurality of stored weight vectors to the RIS sequentially, wherein only a single weight vector is applied to the RIS at a time.

In a third aspect, alone or in combination with one or more of the first and second aspects, process 900 includes receiving, from a network node, an indication of a particular weight vector, of the plurality of stored weight vectors, associated with a highest performance indicator of a plurality of performance indicators, wherein transmitting the spatially multiplexed communication to the receiver in accordance with the weight vector comprises transmitting the spatially multiplexed communication to the receiver in accordance with the particular weight vector.

In a fourth aspect, alone or in combination with one or more of the first through third aspects, process 900 includes using the particular weight vector associated with the highest performance indicator for uplink communications and downlink communications.

In a fifth aspect, alone or in combination with one or more of the first through fourth aspects, process 900 includes receiving, from a network node, an indication of a pair of weight vectors and an indication of a transmitter weight vector that satisfies a system performance threshold for a corresponding receiver weight vector, wherein only a single weight vector is applied to the RIS at a time.

In a sixth aspect, alone or in combination with one or more of the first through fifth aspects, process 900 includes identifying, for each weight vector of the pair of weight vectors, a system performance for each transmitter weight vector of a plurality of transmitter weight vectors, or identifying, for each transmitter weight vector of the plurality of transmitter weight vectors, a system performance for each weight vector of the pair of weight vectors.

In a seventh aspect, alone or in combination with one or more of the first through sixth aspects, process 900 includes receiving, from a network node, an indication of a pair of weight vectors and an indication of a receiver weight vector that satisfies a system performance threshold for a corresponding transmitter weight vector, wherein only a single weight vector is applied to the RIS at a time.

In an eighth aspect, alone or in combination with one or more of the first through seventh aspects, process 900 includes identifying, for each weight vector of the pair of weight vectors, a system performance for each receiver weight vector of a plurality of receiver weight vectors, or identifying, for each receiver weight vector of the plurality of receiver weight vectors, a system performance for each weight vector of the pair of weight vectors.

In a ninth aspect, alone or in combination with one or more of the first through eighth aspects, the plurality of stored weight vectors are associated with a set of arrival azimuth and zenith angles and a set of departure azimuth and zenith angles.

In a tenth aspect, alone or in combination with one or more of the first through ninth aspects, the plurality of stored weight vectors are associated with a set of distance pairs, each distance pair of the set of distance pairs indicating a distance between the transmitter and the RIS and a distance between the RIS and the receiver.

In an eleventh aspect, alone or in combination with one or more of the first through tenth aspects, the plurality of stored weight vectors are associated with the RIS performing as a plane mirror, a convex mirror, or a concave mirror.

In a twelfth aspect, alone or in combination with one or more of the first through eleventh aspects, each weight vector of the plurality of stored weight vectors is associated with a different coverage area for a system that includes the transmitter, the receiver, and the RIS.

In a thirteenth aspect, alone or in combination with one or more of the first through twelfth aspects, each weight vector of the plurality of stored weight vectors is associated with the RIS performing as a mirror having a particular orientation.

In a fourteenth aspect, alone or in combination with one or more of the first through thirteenth aspects, each weight vector of the plurality of stored weight vectors is associated with the RIS performing as a mirror having a particular curvature.

In a fifteenth aspect, alone or in combination with one or more of the first through fourteenth aspects, selecting the weight vector comprises selecting the weight vector in accordance with one or more characteristics of a group of transmitter devices and one or more characteristics of a group of receiver devices.

In a sixteenth aspect, alone or in combination with one or more of the first through fifteenth aspects, selecting the weight vector further comprises selecting the weight vector for the RIS to perform as a convex mirror.

In a seventeenth aspect, alone or in combination with one or more of the first through sixteenth aspects, the RIS has a shape that is non-flat.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
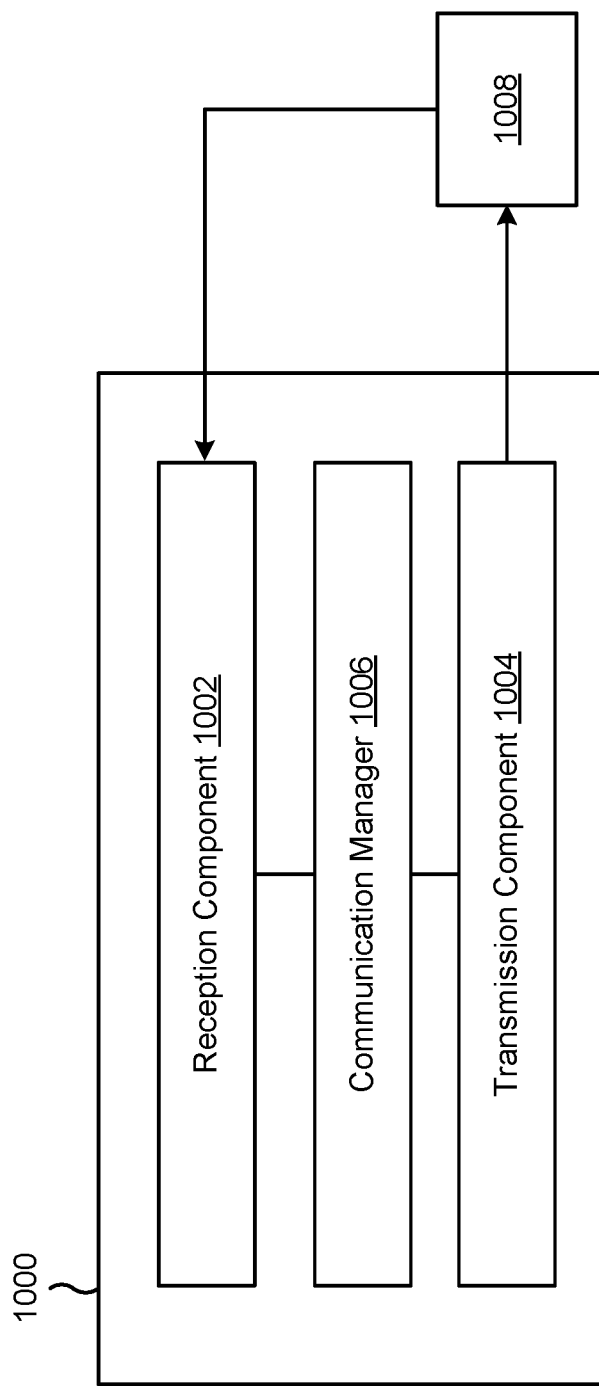
FIG. 10 is a diagram of an example apparatus for wireless communication, in accordance with the present disclosure.

FIG. 10 is a diagram of an example apparatus 1000 for wireless communication, in accordance with the present disclosure. In some aspects, the apparatus 1000 may be a UE, or a UE may include the apparatus 1000. In some other aspects, the apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). The communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the UE or the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may select a weight vector, from a plurality of stored weight vectors, for a RIS that is configured to enable a spatially multiplexed communication, between the transmitter and a receiver, that includes two or more layers for each polarization of a plurality of polarizations for the spatially multiplexed communication. The transmission component 1004 may transmit, to the receiver via the RIS, the spatially multiplexed communication in accordance with the weight vector.

The reception component 1002 may receive, from a network node, an indication of a pair of weight vectors and an indication of a transmitter weight vector that satisfies a system performance threshold for a corresponding receiver weight vector, wherein only a single weight vector is applied to the RIS at a time. The communication manager 1006 may identify, for each weight vector of the pair of weight vectors, a system performance for each transmitter weight vector of a plurality of transmitter weight vectors. The communication manager 1006 may identify, for each transmitter weight vector of the plurality of transmitter weight vectors, a system performance for each weight vector of the pair of weight vectors. The reception component 1002 may receive, from a network node, an indication of a pair of weight vectors and an indication of a receiver weight vector that satisfies a system performance threshold for a corresponding transmitter weight vector, wherein only a single weight vector is applied to the RIS at a time. The communication manager 1006 may identify, for each weight vector of the pair of weight vectors, a system performance for each receiver weight vector of a plurality of receiver weight vectors. The communication manager 1006 may identify, for each receiver weight vector of the plurality of receiver weight vectors, a system performance for each weight vector of the pair of weight vectors.

The communication manager 1006 may select a weight vector, from a plurality of stored weight vectors, for a RIS that is configured to enable a spatially multiplexed communication, between a transmitter and the receiver, that includes two or more layers for each polarization of a plurality of polarizations for the spatially multiplexed communication. The reception component 1002 may receive, from the transmitter via the RIS, the spatially multiplexed communication in accordance with the weight vector.

The reception component 1002 may receive, from a network node, an indication of a pair of weight vectors and an indication of a transmitter weight vector that satisfies a system performance threshold for a corresponding receiver weight vector, wherein only a single weight vector is applied to the RIS at a time. The communication manager 1006 may identify, for each weight vector of the pair of weight vectors, a system performance for each transmitter weight vector of a plurality of transmitter weight vectors. The communication manager 1006 may identify, for each transmitter weight vector of the plurality of transmitter weight vectors, a system performance for each weight vector of the pair of weight vectors. The reception component 1002 may receive, from a network node, an indication of a pair of weight vectors and an indication of a receiver weight vector that satisfies a system performance threshold for a corresponding transmitter weight vector, wherein only a single weight vector is applied to the RIS at a time. The communication manager 1006 may identify, for each weight vector of the pair of weight vectors, a system performance for each receiver weight vector of a plurality of receiver weight vectors. The communication manager 1006 may identify, for each receiver weight vector of the plurality of receiver weight vectors, a system performance for each weight vector of the pair of weight vectors.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
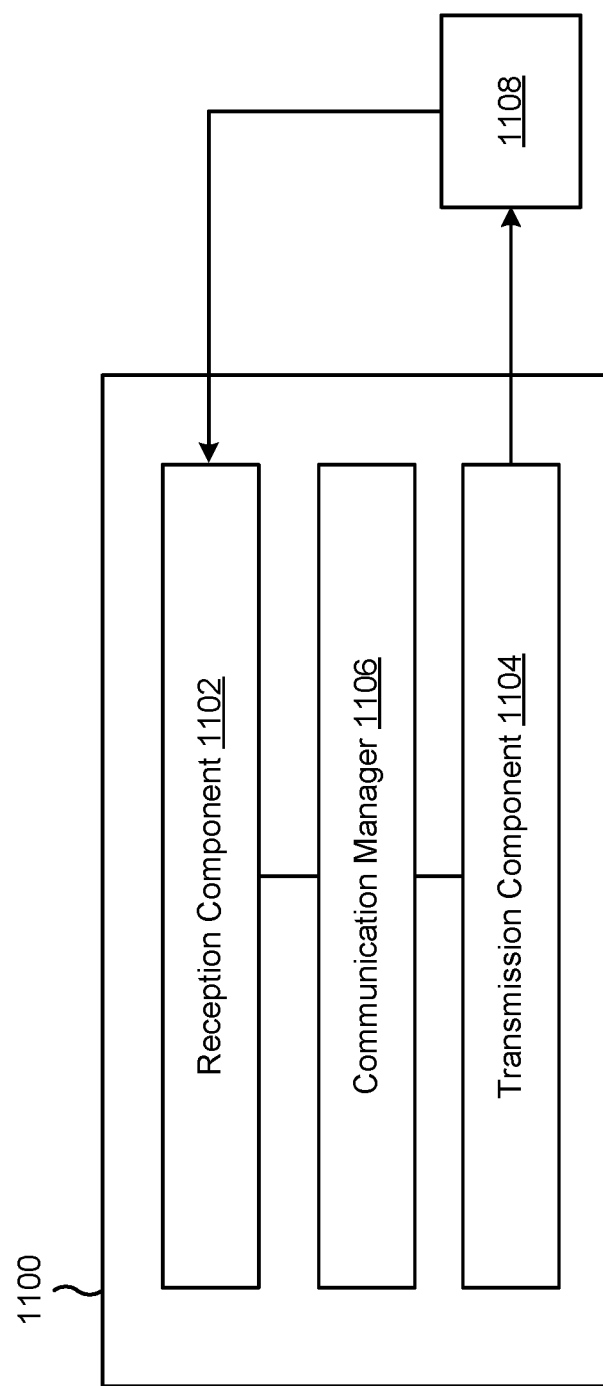
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a RIS, or a RIS may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-6. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the RIS described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the RIS described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the RIS described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may select a weight vector, from a plurality of stored weight vectors, for enabling a spatially multiplexed communication, between a transmitter and a receiver, that includes two or more layers for each polarization of a plurality of polarizations for the spatially multiplexed communication. The reception component 1102 may receive the spatially multiplexed communication from the transmitter. The transmission component 1104 may transmit the spatially multiplexed communication to the receiver in accordance with the weight vector.

The reception component 1102 may receive, from a network node, an indication of a particular weight vector, of the plurality of stored weight vectors, associated with a highest performance indicator of a plurality of performance indicators, wherein transmitting the spatially multiplexed communication to the receiver in accordance with the weight vector comprises transmitting the spatially multiplexed communication to the receiver in accordance with the particular weight vector. The communication manager 1106 may use the particular weight vector for uplink communications and downlink communications. The reception component 1102 may receive, from a network node, an indication of a pair of weight vectors and an indication of a transmitter weight vector that satisfies a system performance threshold for a corresponding receiver weight vector, wherein only a single weight vector is applied to the RIS at a time. The communication manager 1106 may identify, for each weight vector of the pair of weight vectors, a system performance for each transmitter weight vector of a plurality of transmitter weight vectors. The communication manager 1106 may identify, for each transmitter weight vector of the plurality of transmitter weight vectors, a system performance for each weight vector of the pair of weight vectors. The reception component 1102 may receive, from a network node, an indication of a pair of weight vectors and an indication of a receiver weight vector that satisfies a system performance threshold for a corresponding transmitter weight vector, wherein only a single weight vector is applied to the RIS at a time. The communication manager 1106 may identify, for each weight vector of the pair of weight vectors, a system performance for each receiver weight vector of a plurality of receiver weight vectors. The communication manager 1106 may identify, for each receiver weight vector of the plurality of receiver weight vectors, a system performance for each weight vector of the pair of weight vectors.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitter, comprising: selecting a weight vector, from a plurality of stored weight vectors, for a reconfigurable intelligent surface (RIS) that is configured to enable a spatially multiplexed communication, between the transmitter and a receiver, that includes two or more layers for each polarization of a plurality of polarizations for the spatially multiplexed communication; and transmitting, to the receiver via the RIS, the spatially multiplexed communication in accordance with the weight vector.

Aspect 2: The method of Aspect 1, wherein the plurality of stored weight vectors are stored by at least one of the transmitter, the receiver, or the RIS.

Aspect 3: The method of any of Aspects 1-2, further comprising applying each weight vector of the plurality of stored weight vectors to the RIS sequentially, wherein only a single weight vector is applied to the RIS at a time.

Aspect 4: The method of any of Aspects 1-3, further comprising receiving, from a network node, an indication of a pair of weight vectors and an indication of a transmitter weight vector that satisfies a system performance threshold for a corresponding receiver weight vector, wherein only a single weight vector is applied to the RIS at a time.

Aspect 5: The method of Aspect 4, further comprising: identifying, for each weight vector of the pair of weight vectors, a system performance for each transmitter weight vector of a plurality of transmitter weight vectors; or identifying, for each transmitter weight vector of the plurality of transmitter weight vectors, a system performance for each weight vector of the pair of weight vectors.

Aspect 6: The method of any of Aspects 1-5, further comprising receiving, from a network node, an indication of a pair of weight vectors and an indication of a receiver weight vector that satisfies a system performance threshold for a corresponding transmitter weight vector, wherein only a single weight vector is applied to the RIS at a time.

Aspect 7: The method of Aspect 6, further comprising: identifying, for each weight vector of the pair of weight vectors, a system performance for each receiver weight vector of a plurality of receiver weight vectors; or identifying, for each receiver weight vector of the plurality of receiver weight vectors, a system performance for each weight vector of the pair of weight vectors.

Aspect 8: The method of any of Aspects 1-7, wherein the plurality of stored weight vectors are associated with a set of arrival azimuth and zenith angles and a set of departure azimuth and zenith angles.

Aspect 9: The method of any of Aspects 1-8, wherein the plurality of stored weight vectors are associated with a set of distance pairs, each distance pair of the set of distance pairs indicating a distance between the transmitter and the RIS and a distance between the RIS and the receiver.

Aspect 10: The method of any of Aspects 1-9, wherein the plurality of stored weight vectors are associated with the RIS performing as a plane mirror, a convex mirror, or a concave mirror.

Aspect 11: The method of Aspect 10, wherein each weight vector of the plurality of stored weight vectors is associated with a different coverage area for a system that includes the transmitter, the receiver, and the RIS.

Aspect 12: The method of Aspect 10, wherein each weight vector of the plurality of stored weight vectors is associated with the RIS performing as a mirror having a particular orientation.

Aspect 13: The method of Aspect 10, wherein each weight vector of the plurality of stored weight vectors is associated with the RIS performing as a mirror having a particular curvature.

Aspect 14: The method of any of Aspects 1-13, wherein selecting the weight vector comprises selecting the weight vector in accordance with one or more characteristics of a group of transmitter devices and one or more characteristics of a group of receiver devices.

Aspect 15: The method of Aspect 14, wherein selecting the weight vector further comprises selecting the weight vector for the RIS to perform as a convex mirror.

Aspect 16: The method of any of Aspects 1-15, wherein the RIS has a shape that is non-flat.

Aspect 17: A method of wireless communication performed by a receiver, comprising: selecting a weight vector, from a plurality of stored weight vectors, for a reconfigurable intelligent surface (RIS) that is configured to enable a spatially multiplexed communication, between a transmitter and the receiver, that includes two or more layers for each polarization of a plurality of polarizations for the spatially multiplexed communication; and receiving, from the transmitter via the RIS, the spatially multiplexed communication in accordance with the weight vector.

Aspect 18: The method of Aspect 17, wherein the plurality of stored weight vectors are stored by at least one of the transmitter, the receiver, or the RIS.

Aspect 19: The method of any of Aspects 17-18, further comprising applying each weight vector of the plurality of stored weight vectors to the RIS sequentially, wherein only a single weight vector is applied to the RIS at a time; measuring a performance of a system that includes the transmitter, the receiver, and the RIS; and transmitting, to a network node, an indication of one or more weight vectors, of the plurality of stored weight vectors, associated with respective performance indicators that are greater than a performance indicator threshold.

Aspect 20: The method of any of Aspects 17-19, further comprising receiving, from a network node, an indication of a pair of weight vectors and an indication of a transmitter weight vector that satisfies a system performance threshold for a corresponding receiver weight vector, wherein only a single weight vector is applied to the RIS at a time.

Aspect 21: The method of Aspect 20, further comprising: identifying, for each weight vector of the pair of weight vectors, a system performance for each transmitter weight vector of a plurality of transmitter weight vectors; or identifying, for each transmitter weight vector of the plurality of transmitter weight vectors, a system performance for each weight vector of the pair of weight vectors.

Aspect 22: The method of any of Aspects 17-21, further comprising receiving, from a network node, an indication of a pair of weight vectors and an indication of a receiver weight vector that satisfies a system performance threshold for a corresponding transmitter weight vector, wherein only a single weight vector is applied to the RIS at a time.

Aspect 23: The method of Aspect 22, further comprising: identifying, for each weight vector of the pair of weight vectors, a system performance for each receiver weight vector of a plurality of receiver weight vectors; or identifying, for each receiver weight vector of the plurality of receiver weight vectors, a system performance for each weight vector of the pair of weight vectors.

Aspect 24: The method of any of Aspects 17-23, wherein the plurality of stored weight vectors are associated with a set of arrival azimuth and zenith angles and a set of departure azimuth and zenith angles.

Aspect 25: The method of any of Aspects 17-24, wherein the plurality of stored weight vectors are associated with a set of distance pairs, each distance pair of the set of distance pairs indicating a distance between the transmitter and the RIS and a distance between the RIS and the receiver.

Aspect 26: The method of any of Aspects 17-25, wherein the plurality of stored weight vectors are associated with the RIS performing as a plane mirror, a convex mirror, or a concave mirror.

Aspect 27: The method of Aspect 26, wherein each weight vector of the plurality of stored weight vectors is associated with a different coverage area for a system that includes the transmitter, the receiver, and the RIS.

Aspect 28: The method of Aspect 26, wherein each weight vector of the plurality of stored weight vectors is associated with the RIS performing as a mirror having a particular orientation.

Aspect 29: The method of Aspect 26, wherein each weight vector of the plurality of stored weight vectors is associated with the RIS performing as a mirror having a particular curvature.

Aspect 30: The method of any of Aspects 17-29, wherein selecting the weight vector comprises selecting the weight vector in accordance with one or more characteristics of a group of transmitter devices and one or more characteristics of a group of receiver devices.

Aspect 31: The method of Aspect 30, wherein selecting the weight vector further comprises selecting the weight vector for the RIS to perform as a convex mirror.

Aspect 32: The method of any of Aspects 17-31, wherein the RIS has a shape that is non-flat.

Aspect 33: A method of wireless communication performed by a reconfigurable intelligent surface (RIS), comprising: selecting a weight vector, from a plurality of stored weight vectors, for enabling a spatially multiplexed communication, between a transmitter and a receiver, that includes two or more layers for each polarization of a plurality of polarizations for the spatially multiplexed communication; receiving the spatially multiplexed communication from the transmitter; and transmitting the spatially multiplexed communication to the receiver in accordance with the weight vector.

Aspect 34: The method of Aspect 33, wherein the plurality of stored weight vectors are stored by at least one of the transmitter, the receiver, or the RIS.

Aspect 35: The method of any of Aspects 33-34, further comprising applying each weight vector of the plurality of stored weight vectors to the RIS sequentially, wherein only a single weight vector is applied to the RIS at a time.

Aspect 36: The method of any of Aspects 33-35, further comprising receiving, from a network node, an indication of a particular weight vector, of the plurality of stored weight vectors, associated with a highest performance indicator of a plurality of performance indicators, wherein transmitting the spatially multiplexed communication to the receiver in accordance with the weight vector comprises transmitting the spatially multiplexed communication to the receiver in accordance with the particular weight vector.

Aspect 37: The method of Aspect 36, further comprising using the particular weight vector associated with the highest performance indicator for uplink communications and downlink communications.

Aspect 38: The method of any of Aspects 33-37, further comprising receiving, from a network node, an indication of a pair of weight vectors and an indication of a transmitter weight vector that satisfies a system performance threshold for a corresponding receiver weight vector, wherein only a single weight vector is applied to the RIS at a time.

Aspect 39: The method of Aspect 38, further comprising: identifying, for each weight vector of the pair of weight vectors, a system performance for each transmitter weight vector of a plurality of transmitter weight vectors; or identifying, for each transmitter weight vector of the plurality of transmitter weight vectors, a system performance for each weight vector of the pair of weight vectors.

Aspect 40: The method of any of Aspects 33-39, further comprising receiving, from a network node, an indication of a pair of weight vectors and an indication of a receiver weight vector that satisfies a system performance threshold for a corresponding transmitter weight vector, wherein only a single weight vector is applied to the RIS at a time.

Aspect 41: The method of Aspect 40, further comprising: identifying, for each weight vector of the pair of weight vectors, a system performance for each receiver weight vector of a plurality of receiver weight vectors; or identifying, for each receiver weight vector of the plurality of receiver weight vectors, a system performance for each weight vector of the pair of weight vectors.

Aspect 42: The method of any of Aspects 33-41, wherein the plurality of stored weight vectors are associated with a set of arrival azimuth and zenith angles and a set of departure azimuth and zenith angles.

Aspect 43: The method of any of Aspects 33-42, wherein the plurality of stored weight vectors are associated with a set of distance pairs, each distance pair of the set of distance pairs indicating a distance between the transmitter and the RIS and a distance between the RIS and the receiver.

Aspect 44: The method of any of Aspects 33-43, wherein the plurality of stored weight vectors are associated with the RIS performing as a plane mirror, a convex mirror, or a concave mirror.

Aspect 45: The method of Aspect 44, wherein each weight vector of the plurality of stored weight vectors is associated with a different coverage area for a system that includes the transmitter, the receiver, and the RIS.

Aspect 46: The method of Aspect 44, wherein each weight vector of the plurality of stored weight vectors is associated with the RIS performing as a mirror having a particular orientation.

Aspect 47: The method of Aspect 44, wherein each weight vector of the plurality of stored weight vectors is associated with the RIS performing as a mirror having a particular curvature.

Aspect 48: The method of any of Aspects 33-47, wherein selecting the weight vector comprises selecting the weight vector in accordance with one or more characteristics of a group of transmitter devices and one or more characteristics of a group of receiver devices.

Aspect 49: The method of Aspect 48, wherein selecting the weight vector further comprises selecting the weight vector for the RIS to perform as a convex mirror.

Aspect 50: The method of any of Aspects 33-49, wherein the RIS has a shape that is non-flat.

Aspect 51: An apparatus for wireless communication at a device, comprising a processor; memory coupled with the processor; and instructions stored in the memory and executable by the processor to cause the apparatus to perform the method of one or more of Aspects 1-50.

Aspect 52: A device for wireless communication, comprising a memory and one or more processors coupled to the memory, the one or more processors configured to perform the method of one or more of Aspects 1-50.

Aspect 53: An apparatus for wireless communication, comprising at least one means for performing the method of one or more of Aspects 1-50.

Aspect 54: A non-transitory computer-readable medium storing code for wireless communication, the code comprising instructions executable by a processor to perform the method of one or more of Aspects 1-50.

Aspect 55: A non-transitory computer-readable medium storing a set of instructions for wireless communication, the set of instructions comprising one or more instructions that, when executed by one or more processors of a device, cause the device to perform the method of one or more of Aspects 1-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter for wireless communication, comprising:
   one or more memories; and
   one or more processors, coupled to the one or more memories, configured to:
      receive, from a network node, an indication of two or more reconfigurable intelligent surface (RIS) weight vectors and an indication of a transmitter weight vector that satisfies a system performance threshold for a corresponding receiver weight vector;
      select a RIS weight vector, from the two or more RIS weight vectors, for a RIS that is configured to enable a spatially multiplexed communication, between the transmitter and a receiver, that includes two or more layers for each polarization of a plurality of polarizations for the spatially multiplexed communication; and
      transmit, to the receiver via the RIS, the spatially multiplexed communication in accordance with the RIS weight vector and the transmitter weight vector.

2. The transmitter of claim 1, wherein the one or more processors are further configured to apply each RIS weight vector of the two or more RIS weight vectors to the RIS sequentially, wherein only a single RIS weight vector is applied to the RIS at a time.

3. The transmitter of claim 1, wherein the one or more processors are further configured to:
   identify a system performance, wherein the one or more processors, to identify the system performance, are configured to:
      identify, for each RIS weight vector of the two or more RIS weight vectors, the system performance for each transmitter weight vector of a plurality of transmitter weight vectors; or
      identify, for each transmitter weight vector of the plurality of transmitter weight vectors, the system performance for each RIS weight vector of the two or more RIS weight vectors.

4. The transmitter of claim 1, wherein the one or more processors are further configured to:
   receive, from the network node, an indication of a receiver weight vector that satisfies the system performance threshold for a corresponding transmitter weight vector, wherein only a single weight vector is applied to the RIS at a time; and
   identify a system performance, wherein the one or more processors, to identify the system performance, are configured to:
      identify, for each RIS weight vector of the two or more RIS weight vectors, the system performance for each receiver weight vector of a plurality of receiver weight vectors; or
      identify, for each receiver weight vector of the plurality of receiver weight vectors, the system performance for each RIS weight vector of the two or more RIS weight vectors.

5. The transmitter of claim 1, wherein the two or more RIS weight vectors are associated with a set of distance pairs, each distance pair of the set of distance pairs indicating a distance between the transmitter and the RIS and a distance between the RIS and the receiver.

6. The transmitter of claim 1, wherein the two or more RIS weight vectors includes a first RIS weight vector that causes the RIS to behave as a convex mirror, a second RIS weight vector that causes the RIS to behave as a concave mirror, and a third RIS weight vector that causes the RIS to behave as a flat mirror.

7. The transmitter of claim 6, wherein each RIS weight vector of the two or more RIS weight vectors is associated with a different coverage area for a system that includes the transmitter, the receiver, and the RIS.

8. The transmitter of claim 7, wherein each RIS weight vector of the two or more RIS weight vectors is associated with the RIS performing as a mirror having a particular orientation or a particular curvature.

9. The transmitter of claim 1, wherein the one or more processors, to select the RIS weight vector, are configured to select the RIS weight vector in accordance with one or more characteristics of a group of transmitter devices and one or more characteristics of a group of receiver devices.

10. A receiver for wireless communication, comprising:
    one or more memories; and
    one or more processors, coupled to the one or more memories, configured to:
       receive, from a network node, an indication of two or more reconfigurable intelligent surface (RIS) weight vectors and an indication of a receiver weight vector that satisfies a system performance threshold for a corresponding transmitter weight vector;
       select a RIS weight vector, from the two or more RIS weight vectors, for a RIS that is configured to enable a spatially multiplexed communication, between a transmitter and the receiver, that includes two or more layers for each polarization of a plurality of polarizations for the spatially multiplexed communication; and
       receive, from the transmitter via the RIS, the spatially multiplexed communication in accordance with the RIS weight vector and the receiver weight vector.

11. The receiver of claim 10, wherein the one or more processors are further configured to:
    apply each RIS weight vector of the two or more RIS weight vectors to the RIS sequentially, wherein only a single weight vector is applied to the RIS at a time;

measure a performance of a system that includes the transmitter, the receiver, and the RIS; and transmit, to the network node, an indication of one or more RIS weight vectors, of the two or more RIS weight vectors, associated with respective performance indicators that are greater than a performance indicator threshold.

12. The receiver of claim 10, wherein the one or more processors are further configured to:

receive, from the network node, an indication of a transmitter weight vector that satisfies the system performance threshold for a corresponding receiver weight vector, wherein only a single weight vector is applied to the RIS at a time; and identify a system performance, wherein the one or more processors, to identify the system performance, are configured to:

identify, for each RIS weight vector of the two or more RIS weight vectors, the system performance for each transmitter weight vector of a plurality of transmitter weight vectors; or identify, for each transmitter weight vector of the plurality of transmitter weight vectors, the system performance for each RIS weight vector of the two or more RIS weight vectors.

13. The receiver of claim 10, wherein the one or more processors are further configured to:

identify a system performance, wherein the one or more processors, to identify the system performance, are configured to:

identify, for each RIS weight vector of the two or more RIS weight vectors, the system performance for each receiver weight vector of a plurality of receiver weight vectors; or identify, for each receiver weight vector of the plurality of receiver weight vectors, the system performance for each RIS weight vector of the two or more RIS weight vectors.

14. The receiver of claim 10, wherein the two or more RIS weight vectors are associated with a set of distance pairs, each distance pair of the set of distance pairs indicating a distance between the transmitter and the RIS and a distance between the RIS and the receiver.

15. The receiver of claim 10, wherein the two or more RIS weight vectors includes a first RIS weight vector that causes the RIS to behave as a convex mirror, a second RIS weight vector that causes the RIS to behave as a concave mirror, and a third RIS weight vector that causes the RIS to behave as a flat mirror.

16. The receiver of claim 15, wherein each RIS weight vector of the two or more RIS weight vectors is associated with a different coverage area for a system that includes the transmitter, the receiver, and the RIS.

17. The receiver of claim 16, wherein each RIS weight vector of the two or more RIS weight vectors is associated with the RIS performing as a mirror having a particular orientation or a particular curvature.

18. The receiver of claim 10, wherein the one or more processors, to select the RIS weight vector, are configured to select the RIS weight vector in accordance with one or more characteristics of a group of transmitter devices and one or more characteristics of a group of receiver devices.

19. A reconfigurable intelligent surface (RIS) for wireless communication, comprising:

one or more memories; and one or more processors, coupled to the one or more memories, configured to:

receive, from a network node, an indication of two or more RIS weight vectors and an indication of a transmitter weight vector that satisfies a system performance threshold for a corresponding receiver weight vector;

select a RIS weight vector, from the two or more RIS weight vectors, for enabling a spatially multiplexed communication, between a transmitter and a receiver, that includes two or more layers for each polarization of a plurality of polarizations for the spatially multiplexed communication;

receive the spatially multiplexed communication from the transmitter; and transmit the spatially multiplexed communication to the receiver in accordance with the RIS weight vector.

20. The RIS of claim 19, wherein the one or more processors are further configured to apply each RIS weight vector of the two or more RIS weight vectors to the RIS sequentially, wherein only a single weight vector is applied to the RIS at a time.

21. The RIS of claim 19, wherein the one or more processors are further configured to receive, from the network node, an indication of a particular weight vector, of the two or more RIS weight vectors, associated with a highest performance indicator of a plurality of performance indicators, and wherein the one or more processors, to transmit the spatially multiplexed communication to the receiver in accordance with the RIS weight vector, are configured to:

transmit the spatially multiplexed communication to the receiver in accordance with the particular weight vector.

22. The RIS of claim 21, wherein the one or more processors are further configured to use the particular weight vector for uplink communications and downlink communications.

23. The RIS of claim 19, wherein the one or more processors are further configured to:

identify a system performance, wherein the one or more processors, to identify the system performance, are configured to:

identify, for each RIS weight vector of the two or more RIS weight vectors, the system performance for each transmitter weight vector of a plurality of transmitter weight vectors; or identify, for each transmitter weight vector of the plurality of transmitter weight vectors, the system performance for each RIS weight vector of the two or more RIS weight vectors.

24. The RIS of claim 19, wherein the one or more processors are further configured to:

receive, from the network node, an indication of a receiver weight vector that satisfies a system performance threshold for a corresponding transmitter weight vector, wherein only a single weight vector is applied to the RIS at a time; and identify a system performance, wherein the one or more processors, to identify the system performance, are configured to:

identify, for each RIS weight vector of the two or more RIS weight vectors, the system performance for each receiver weight vector of a plurality of receiver weight vectors; or identify, for each receiver weight vector of the plurality of receiver weight vectors, the system performance for each RIS weight vector of the two or more RIS weight vectors.

25. The RIS of claim 19, wherein the two or more RIS weight vectors are associated with a set of distance pairs, each distance pair of the set of distance pairs indicating a distance between the transmitter and the RIS and a distance between the RIS and the receiver.

26. The RIS of claim 19, wherein the two or more RIS weight vectors includes a first RIS weight vector that causes the RIS to behave as a convex mirror, a second RIS weight vector that causes the RIS to behave as a concave mirror, and a third RIS weight vector that causes the RIS to behave as a flat mirror.

27. The RIS of claim 26, wherein each RIS weight vector of the two or more RIS weight vectors is associated with a different coverage area for a system that includes the transmitter, the receiver, and the RIS.

28. The RIS of claim 27, wherein each RIS weight vector of the two or more RIS weight vectors is associated with the RIS performing as a mirror having a particular orientation or a particular curvature.

29. The RIS of claim 19, wherein the one or more processors, to select the RIS weight vector, are configured to select the RIS weight vector in accordance with one or more characteristics of a group of transmitter devices and one or more characteristics of a group of receiver devices.

30. A method of wireless communication performed by a reconfigurable intelligent surface (RIS), comprising:
    receiving, from a network node, an indication of two or more RIS weight vectors and an indication of a transmitter weight vector that satisfies a system performance threshold for a corresponding receiver weight vector;
    selecting a RIS weight vector, from the two or more RIS weight vectors, for enabling a spatially multiplexed communication, between a transmitter and a receiver, that includes two or more layers for each polarization of a plurality of polarizations for the spatially multiplexed communication;
    receiving the spatially multiplexed communication from the transmitter; and
    transmitting the spatially multiplexed communication to the receiver in accordance with the RIS weight vector.

* * * * *